Figure 1:
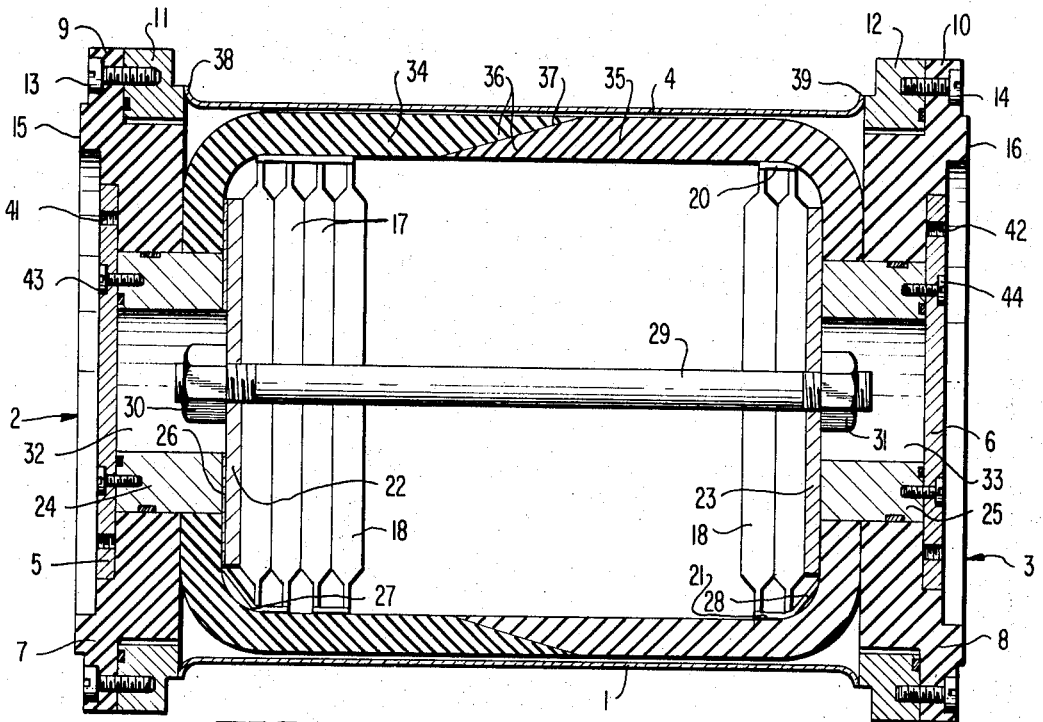

United States Patent
Kind et al.

[15] 3,694,709
[45] Sept. 26, 1972

[54] ELECTRICAL HIGH VOLTAGE CONDENSER FOR PULSE DISCHARGES

[72] Inventors: Dieter Kind, Knappstrasse 4, 33 Braunschweig; Manfred Naglik, Am Spitzen Hey 26, Braunschweig-Mascherode; Albert Kaltofen, Herrenleite 1, Amlingstadt; Karl Zwecker, Oberer Stephensberg 93a, 86 Bamberg, all of Germany

[22] Filed: Sept. 21, 1971

[21] Appl. No.: 182,452

[52] U.S. Cl. ............. 317/242, 317/260, 317/261
[51] Int. Cl. ........................................ H01g 3/28
[58] Field of Search ................. 317/242, 260, 261

[56] References Cited

UNITED STATES PATENTS 3,085,176  4/1963  Fischer ................ 317/260
3,302,082  1/1967  Preissinger ............ 317/260
3,308,358  3/1967  Blank .................. 317/260

*Primary Examiner*—E. A. Goldberg
*Attorney*—Craig, Antonelli & Hill

[57] ABSTRACT

An electrical high voltage condenser with high energy content for current surge discharges which consists of a number of condenser elements connected with each other by series and parallel connections, which are installed into a metal housing and insulated with respect thereto, whereby the two connecting terminals of the condenser are arranged insulated at opposite surfaces of the metal housing and the connecting terminals are arranged at least approximately in a plane with connecting elements of the metal housing for external connections.

15 Claims, 2 Drawing Figures

PATENTED SEP 26 1972 3,694,709

INVENTORS
DIETER KIND, MANFRED NAGLIK
ALBERT KALTOFEN, KARL ZWECKER

BY Craig, Antonelli & Hill
ATTORNEYS

ELECTRICAL HIGH VOLTAGE CONDENSER FOR PULSE DISCHARGES

The present invention relates to an electric high voltage condenser with high energy content for surge current discharges, which consists of a plurality of condenser elements connected with each other by series and parallel connections, installed in a common metal housing and insulated with respect to the metal housing.

Condensers for surge current discharges have to be able to supply very high surge currents over short periods of time. Prerequisite therefor is that they possess a slight self-inductance and a small ohmic resistance. In order to comply with the requirement of a small self-inductance, it is necessary that the current feed and return line are coordinated as close as possible adjacent one another. Pulse condensers therefore possess for the most part a closely abutting metallic housing which forms a part of the discharge circuit (coaxial current conduction).

Thus, a surge condenser consisting of several coaxial circular windings electrically series-connected is described for example in the German Offenlegungsschrift 1,539,900. In order to withstand the very high currents flowing during the discharge over short periods of time and the mechanical and electrical stresses conditioned thereby, the individual condensers surrounded by a non-magnetic metallic housing are detachably combined into a column in such a manner that the cover of one outermost housing and the bottom of the other outermost housing of the column are connected with the external connections disposed on an end face of the condenser. A connecting terminal is thus connected with the conducting housing whereas the other connecting terminal is extended out of the same in an insulated manner. One thus obtains a pulse condenser of so-called pot- or cup-type construction. This known arrangement requires an encapsulation of the individual condensers. This not only requires an increased expenditure but also a larger structural height and therewith an increased self-inductance of the surge condenser.

An electric high-voltage condenser unit for surge current discharges is described in the German DAS 1,117,215. This condenser unit contains in a housing consisting of a brass tube, five condenser elements arranged coaxially one above the other and electrically connected in series which are wound from metallized paper. The diameter of the individual tubular windings is thereby larger than their axial length. Also, with this condenser a connecting terminal is connected with the conducting housing whereas the other connecting terminal is extended insulated out of the housing. With this high voltage condenser also constructed as pot- or cup-type condenser, the inductance of the connecting terminals, especially of the connecting terminal extending outwardly in an insulated manner, represents a considerable proportion of the entire self-inductance of the condenser.

Finally an electric high-voltage condenser with high energy content for surge current discharges is described in the German DAS 1,172,776 which is constructed of a plurality of self-healing condenser elements connected with each other by series and parallel connections and built into a common housing. Two columns each of two condenser elements connected with each other by a series connection are installed into a steel sheet-metal housing. A disk insulator is provided for the insulated extension of one condenser electrode through the condenser housing. The metallic casing connected with the other condenser electrode is connected with the metallic insulator socket. Also, this type of high voltage condenser is therefore constructed as pot- or cup-type condenser in which the metallic housing, insulated with respect to the condenser elements, serves as return line for the condenser current.

It is the aim of the present invention to provide a high-voltage condenser for very high voltages which possesses an extraordinarily low self-inductance and which can be used especially also in a fully encapsulated energy storage installation.

The underlying problems are solved in an electric high-voltage condenser of the aforementioned type in accordance with the present invention in that two terminal means of the condenser are arranged insulated at opposite faces of the metal housing means and in that the terminal means are disposed at least approximately in a plane with the connecting portions of the metal housing means for external connections which may include a charging device, a switch, an experiment or the like. By reason of the fact that the two connecting terminals are arranged at opposite surfaces of the metal housing means, the condenser according to the present invention can be combined with a charging device, with a switch and possibly also with an experiment into a structural unit which has an extraordinarily low inductance. In particular, it is possible to install the condenser directly within the confines of an encapsulated installation whereby the metal housing serves as current return line. A further decisive advantage of the condenser of the present invention resides in that by avoiding parts within sparking-distance the insulated connecting terminals are disposed at least approximately in a plane with the connecting portions of the metal housing. An increase of the self-inductance of the condenser by the connection inductances is thereby practically avoided. The self-inductance of the entire condenser is only insignificantly larger than the inductance of the condenser elements forming the winding stack.

The connecting terminals are insulated with advantage with respect to the metal housing by means of insulation plates which include peripheral flanges projecting in the axial direction for the connection of elastic high-voltage-resistant sealing elements. The radial distance between the connecting terminals and the metal housing can be reduced to a minimum by the connection of a high-voltage-resistant sealing element, preferably of silicon rubber, to the axial flanges of the insulating plates and therewith the self-inductance of the condenser can be still further decreased. The use of high-voltage-resistant sealing elements of silicon rubber as so called radial seals is described in the article by Benken entitled "About the Electrical Strength of Gaps Between Solid Insulating Materials" in ETZ-A, Volume 89 - 1968, Issue No. 15, Pages 356–361.

Furthermore, it is advantageous if the condenser elements consist of flat or pancake windings which are arranged in the metal housing in two stacks disposed adjacent one another and are clamped at the end faces by means of a central clamping bolt. The flat windings can be sufficiently strongly pre-stressed by the central bolt so that the large forces occurring during the discharges can be absorbed without difficulty by the clamping mechanism. It is particularly favorable if the insulating plates are provided in their centers with openings for the clamping bolt so that the latter is adapted to be retightened after the insertion of the condenser elements into the metal housing. The maintenance of a predetermined abutment pressure can be assured thereby also after longer periods of operation. In particular, the winding stack can be retightened after the impregnation process of the condenser elements. The condenser elements may be insulated with advantage against the metal housing by an insulating box consisting of two parts. The insulating box is appropriately so dimensioned that it imparts a sufficient mechanical stability to the winding stack. Furthermore, it is of advantage if the two parts of the insulating box are connected at the separating joint at an acute angle. One obtains thereby an overlapping connecting place with a long surface-leakage path which is advantageous especially for pulse condensers of higher or highest voltages. Finally, it is of advantage if the metal housing consists of thin sheet metal absorbing the volume changes of the insulating medium. A separate expansion vessel for the insulating medium can be dispensed with by the diaphragm effect of the metal housing.

Figure 2:
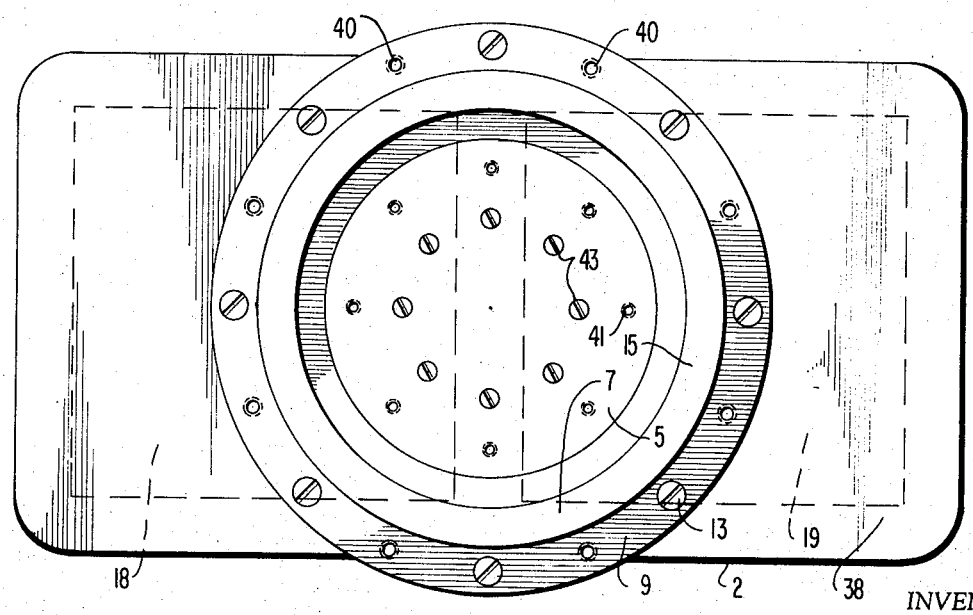

These and further objects, features and advantages of the present invention will become more apparent from the following description when taken in connection with the accompanying drawing which shows, for purposes of illustration only, one embodiment in accordance with the present invention, and wherein FIG. 1 is a longitudinal cross-sectional view through an electrical high voltage condenser according to the present invention, and FIG. 2 is a plan view of the high voltage condenser according to FIG. 1.

Referring now to the drawing wherein like reference numerals are used throughout the two views to designate like parts, the high voltage condenser 1 according to the present invention includes at opposite surfaces generally designated by reference numerals 2 and 3 of a metal housing 4, connecting terminals 5 and 6 which are insulated for the full operating voltage with respect to the metal housing 4 by means of insulating plates 7 and 8. The insulating plates 7 and 8 consisting preferably of epoxy resin molded material have a connecting flange 9 and 10 by means of which they are adapted to be connected with connecting portions 11 and 12 connected with the metal housing 4, preferably adapted to be secured thereto by means of screws 13 and 14. Ring-shaped flanges 15 and 16 projecting in the axial direction at the insulating plates 7 and 8 are provided for the connection of elastic high-voltage-resistant sealing elements, preferably of silicon rubber. The condenser elements consist of flat or pancake windings 17 with a dielectric medium of condenser paper which are arranged in the metal housing 4 in two stacks 18 and 19 (FIG. 2) disposed adjacent one another. The individual turns of the flat windings 17 are in contact by means of bridges 20 and 21 at the end face thereof. For achieving a construction of the winding stacks 18 and 19 having a low inductance, several flat windings 17 are connected in parallel and several of these parallelly connected groups are connected bifilar in series. Pressure plates 22 and 23 of steel are arranged at the ends of the winding stacks 18 and 19 which cover the two winding stacks 18 and 19 and are connected with the connecting terminals 5 and 6 by way of the contact elements 24 and 25. A metal plate 26 soldered to the contact element 24 is provided at the left terminal side (FIG. 1) between the pressure plate 22 and the contact element 24, which loosely abuts against the pressure plate 22. The connecting terminals 5 and 6 are thus electrically connected with the two outermost condenser flat windings 17 by way of the contact elements 24 and 25, the metal plate 26 or the pressure plate 23 as well as the connecting lugs 27 and 28.

In order to avoid movements of the condenser armatures due to electrostatic or electrodynamic forces, the winding stacks 18 and 19 are pressed together by a means of central clamping bolt 29 of glassfiber-reinforced plastic material. The clamping pressure can be adjusted by nuts 30 and 31 which are arranged within the area of apertures 32 and 33 in the center of the insulating plates 7 and 8 and may be retightened, in case of need, after the installation of the winding stacks 18 and 19 into the metal housing 4. Also, an operationally conditioned readjustment of the clamping pressure is possible at any time. For that purpose only the connecting terminals 5 and 6 secured at the insulating plates 7 and 8 by means of screws 43 and 44 have to be removed in order that the nuts 30 and 31 of the clamping bolt 29 become accessible. The insulation of the winding stacks 18 and 19 with respect to the metal housing consists of an insulating box 36 made from pressed board or presspan insulation material and composed of two parts 34 and 35. The wall thickness of the insulating box 36 is so dimensioned that the latter assures a sufficient mechanical stability to the winding stacks 18 and 19. The two parts 34 and 35 of the insulating box 36 are cut at an acute angle at the separating joint 37 thereof. The metal housing consists of a thin sheet metal absorbing the volume changes of the insulating medium, preferably of mineral oil. After the assembly the metal housing is tightly welded at the end face to the housing covers 38 and 39 welded to the metal connecting portions 11 and 12.

As shown in FIG. 2, the insulating plates 7 and 8 are provided with additional threaded bores 40 which serve for the connection of a housing for a switch, for example, a multiple spark gap, a charging installation or an experiment. The switch, the charging installation or the experiment itself are thereby directly connected to the connecting terminals 5 and 6. For that purpose threaded bores 41 and 42 (FIG. 1) are provided.

A high-voltage condenser according to the present invention is characterized in that it can be operated at very high voltages far in excess of 100 kV, for example, at 150 kV with an extraordinarily low self-inductance. As tests have indicated, the overall inductance of a 150 kV unit amounts only to 40 nH. This can be traced back, inter alia, to the fact that the flat connecting terminals can be moved very close to the conducting housing. Advantageous is also the very high energy density of the high voltage condenser according to the present invention. With the described 150 kV condenser, the ratio of energy content/overall volume amounted to about 0.1 Ws/cm$^3$. Notwithstanding this high energy density, the length of life is also extraordinarily great. The symmetrical coaxial construction enables to connect to one connecting terminal the connecting line to the experiment and to the other connecting terminal the switch and the charging installation. The housing thereby serves as coaxial return line in the discharge circuit. The energy storage unit is favorably made as fully encapsulated structure with silicon rubber as high voltage seals and $SF_6$ as insulating gas for the additional installations flangedly connected to the insulating plates and/or connecting terminals, such as switch, charging installation and experiment.

While we have shown and described only one embodiment in accordance with the present invention, it is understood that the same is not limited thereto but is susceptible of numerous changes and modifications as known to those skilled in the art and we therefore do not wish to be limited to the details shown and described herein but intend to cover all such changes and modifications as are encompassed by the scope of the appended claims.

We claim:

1. An electric high voltage condenser with high energy content for surge current discharges, which includes a plurality of condenser elements installed into a common metal housing means and insulated with respect to the metal housing means, which are connected with each other by series and parallel connections, characterized in that two terminal means of the condenser are arranged insulated at opposite faces of the metal housing means and in that the terminal means are disposed at least approximately in a plane with connecting portions of the metal housing means for external connection.

2. A high voltage condenser according to claim 1, characterized in that the external connection may include a charging device, a switch, an experiment or the like.

3. A high voltage condenser according to claim 1, characterized in that the terminal means are insulated against the metal housing means by insulating plate means which include peripheral flanges projecting in the axial direction for the connection of elastic high-voltage-resistant sealing means.

4. A high voltage condenser according to claim 3, characterized in that the condenser elements consist of flat windings which are arranged in two stacks adjacent one another within the metal housing means and are clamped at the end faces thereof by means of a central clamping bolt.

5. A high voltage condenser according to claim 4, characterized in that the insulating plate means are provided with apertures in the center thereof for the clamping bolt so that the latter can be retightened after the installation of the condenser elements into the metal housing means.

6. A high voltage condenser according to claim 5, characterized in that the condenser elements are insulated with respect to the metal housing means by an insulating box means consisting of two parts.

7. A high voltage condenser according to claim 6, characterized in that the two parts of the insulating box means are connected with each other at the separating joint under an acute angle.

8. A high voltage condenser according to claim 7, characterized in that the metal housing means consists of a relatively thin sheet metal material absorbing the volume changes of an insulating medium on the inside of the housing.

9. A high voltage condenser according to claim 1, characterized in that the condenser elements consist of flat windings which are arranged in two stacks adjacent one another within the metal housing means and are clamped at the end faces thereof by means of a central clamping bolt.

10. A high voltage condenser according to claim 4, characterized in that insulating plate means insulating the terminal means with respect to the housing means are provided with apertures in the center thereof for the clamping bolt so that the latter can be retightened after the installation of the condenser elements into the metal housing means.

11. A high voltage condenser according to claim 1, characterized in that the condenser elements are insulated with respect to the metal housing means by an insulating box means consisting of two parts.

12. A high voltage condenser according to claim 11, characterized in that the two parts of the insulating box means are connected with each other at the separating joint under an acute angle.

13. A high voltage condenser according to claim 1, characterized in that the metal housing means consists of a relatively thin sheet metal material absorbing the volume changes of an insulating medium on the inside of the housing.

14. A high voltage condenser according to claim 13, characterized in that the terminal means are insulated against the metal housing means by insulating plate means which include peripheral flanges projecting in the axial direction for the connection of elastic high-voltage-resistant sealing means.

15. A high voltage condenser according to claim 14, characterized in that the condenser elements are insulated with respect to the metal housing means by an insulating box means consisting of two parts.

* * * * *